United States Patent
Wolf et al.

(10) Patent No.: US 10,215,290 B2
(45) Date of Patent: Feb. 26, 2019

(54) PLUG WITH ATTACHABLE UPPER TRUNNION

(71) Applicant: Cameron International Corporation, Houston, TX (US)

(72) Inventors: Robert H. Wolf, Conway, AR (US); Jacob Layson, Benton, AR (US)

(73) Assignee: Cameron International Corporation, Houston, TX (US)

( * ) Notice: Subject to any disclaimer, the term of this patent is extended or adjusted under 35 U.S.C. 154(b) by 141 days.

(21) Appl. No.: 15/142,962

(22) Filed: Apr. 29, 2016

(65) Prior Publication Data

US 2017/0314685 A1    Nov. 2, 2017

(51) Int. Cl.
    *F16K 5/02*    (2006.01)
    *F16K 5/04*    (2006.01)
    *F16K 5/00*    (2006.01)
    *F16K 5/08*    (2006.01)
    *F16K 5/06*    (2006.01)

(52) U.S. Cl.
    CPC .............. *F16K 5/0492* (2013.01); *F16K 5/00* (2013.01); *F16K 5/0242* (2013.01); *F16K 5/045* (2013.01); *F16K 5/0442* (2013.01); *F16K 5/08* (2013.01); *F16K 5/0647* (2013.01)

(58) Field of Classification Search
    CPC ... F16K 1/04; F16K 1/48; F16K 1/487; F16K 5/0285; F16K 5/02; F16K 5/0242; F16K 5/0485; F16K 5/04; F16K 5/0442; F16K 5/0694; F16K 5/06; F16K 5/0647; F16K 31/508; F16K 31/24
    See application file for complete search history.

(56) References Cited

U.S. PATENT DOCUMENTS

| 668,946 | A | * | 2/1901 | Baker | F16K 1/487 |
| | | | | | 251/145 |
| 3,892,381 | A | * | 7/1975 | Prescott | F16K 5/0647 |
| | | | | | 251/26 |
| 4,239,185 | A | * | 12/1980 | Lowe | F16K 5/162 |
| | | | | | 251/164 |
| 5,127,628 | A | * | 7/1992 | Kemp | F16K 5/0647 |
| | | | | | 251/304 |
| 9,328,827 | B2 | * | 5/2016 | Russell | F16K 5/0647 |
| 9,470,320 | B1 | * | 10/2016 | LaCroix | F16K 5/0657 |
| 2014/0109970 | A1 | * | 4/2014 | Middleton | F16K 5/0207 |
| | | | | | 137/1 |

FOREIGN PATENT DOCUMENTS

| DE | 29500870 | | 3/1995 | |
| DE | 4405089 | | 8/1995 | |
| GB | 1079690 | A * | 8/1967 | ........... F16K 5/0647 |
| WO | WO 2006042583 | | 4/2006 | |

OTHER PUBLICATIONS

Control Seal Valve Manufacturer Standard Execution DBBV.

* cited by examiner

*Primary Examiner* — Reinaldo Sanchez-Medina
*Assistant Examiner* — Hailey K Do
(74) *Attorney, Agent, or Firm* — Gable Gotwals

(57) ABSTRACT

A plug for use in a plug valve includes an attachable upper trunnion that is assembled to the main plug body using fasteners and a male-female dovetail fit. The tensile and compressive loading experienced by the main plug body during its linear motion, and the torsional loading experienced during its 90° rotation, is supported by the fasteners and the dovetail fit.

17 Claims, 3 Drawing Sheets

PLUG WITH ATTACHABLE UPPER TRUNNION

BACKGROUND

This invention is in the field of plug bodies used in double block plug valves and diverter plug valves found in pipeline applications.

A plug valve includes a tapered (wedge-shaped) central or main plug body that moves the valve's seals (permanently bonded into slips) to and from the valve body (see e.g. FIG. 1). In the open position, the seals are completely out of the product flow. Turning the operator hand wheel clockwise rotates the plug body 90° to block flow. During rotation, clearance is maintained between the slip seals and the inside diameter bore of the valve body. When the operator hand wheel is turned further clockwise, the wedge-shaped plug body begins to lower, forcing the slips and their seals outward against the inside diameter bore of the valve body. This produces a seal that holds the pressure of the medium flowing into and through the valve body.

The valve's operator includes a stem or upper trunnion that, unlike the main plug body, is exposed to the environment. Sealing around the upper trunnion is critical to ensure product does not leak out into the environment. Additionally, the upper trunnion experiences the torque load required to open and close the valve during operation. Therefore, some plug valve customers require the upper trunnion to be made from a different material than the main plug body. For example, the upper trunnion can be specified to be made from a stronger and more corrosion resistant material than the rest of the plug body.

The three main ways to meet this different material requirement are: (1) cast the upper trunnion and main plug body as a one-piece casting using the stronger, more corrosion resistant material specified for the upper trunnion (see e.g. FIG. 2); (2) cast the upper trunnion separately using the stronger, corrosion resistant material and then cast the main plug body around the upper trunnion using a different material; or (3) cast each part separately and attach the upper trunnion to the main plug body with a pin. The one-piece casting option makes the plug more expensive because the main plug body is being cast using the stronger, more corrosion resistant material. The cast-around option is difficult to do and results in a relatively high scrap rate due to casting defects. The pinned option introduces a potential failure mode during valve operation.

SUMMARY

A preferred embodiment of a plug includes an attachable upper trunnion that is assembled to the main plug body using fasteners and a male-female dovetail fit. The tensile and compressive loading experienced by the main plug body during its linear motion, and the torsional loading experienced during its 90° rotation, is supported by the fasteners and the dovetail fit.

ELEMENTS AND NUMBERING USED IN THE DRAWINGS AND DETAILED DESCRIPTION

Figure 2:
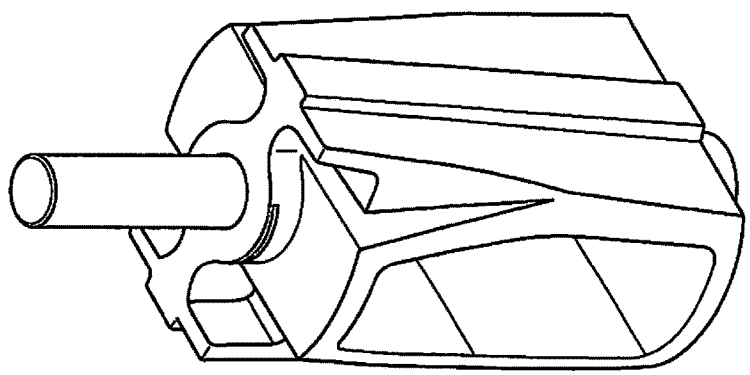
FIG. 2 is an isometric view of a prior art integral upper trunnion plug. Alternatively, the upper trunnion can be cast separately using a stronger, corrosion resistant material and then the main plug body can be cast around the upper trunnion using a different material.
Figure 1:
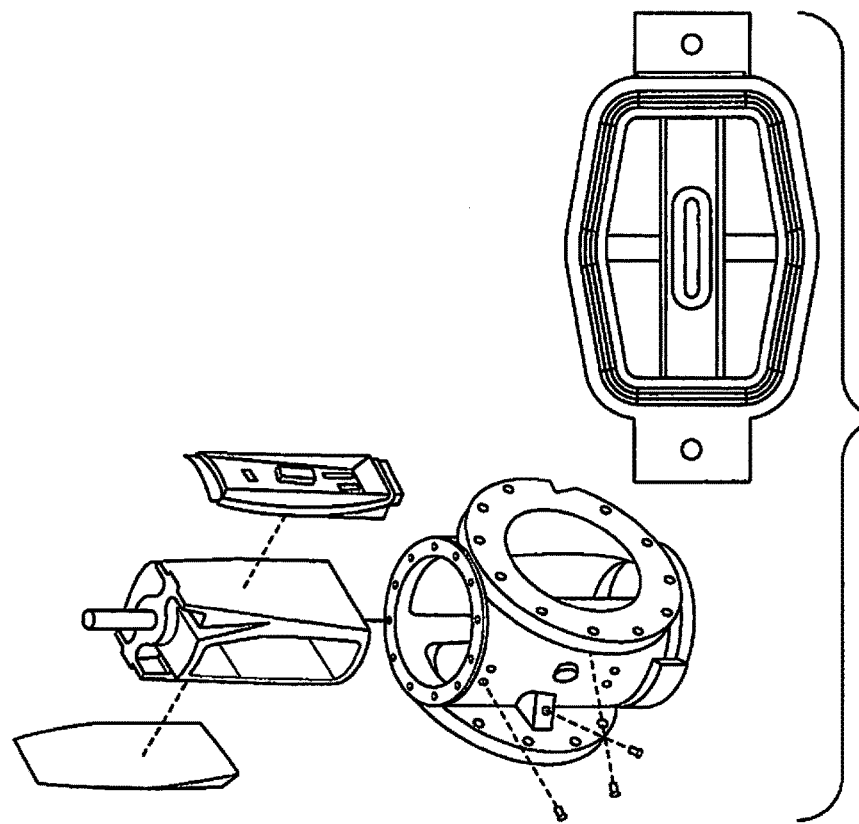
FIG. 1 is an isometric view of the main valve sealing components of the plug valve.

10 Plug for use in a plug valve
20 Main plug body
21 Upper end
23 Channel (sized to tightly receive flange 33)
25 Sidewall
27 Male dovetail
29 Fastener holes
30 Stem or upper trunnion
31 Lower end
33 Flange (with fastener holes complementary to 29)
35 Sidewall
37 Female dovetail
39 Fasteners (preferably machine screws)

DETAILED DESCRIPTION OF THE PREFERRED EMBODIMENTS

Figure 4:
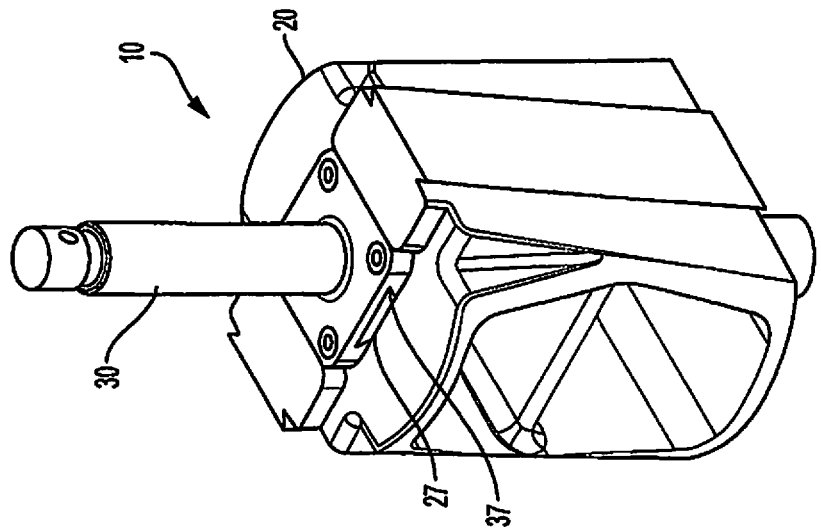
FIG. 4 is an isometric view of the upper trunnion and main plug body of FIG. 3 when assembled together.
Figure 3:
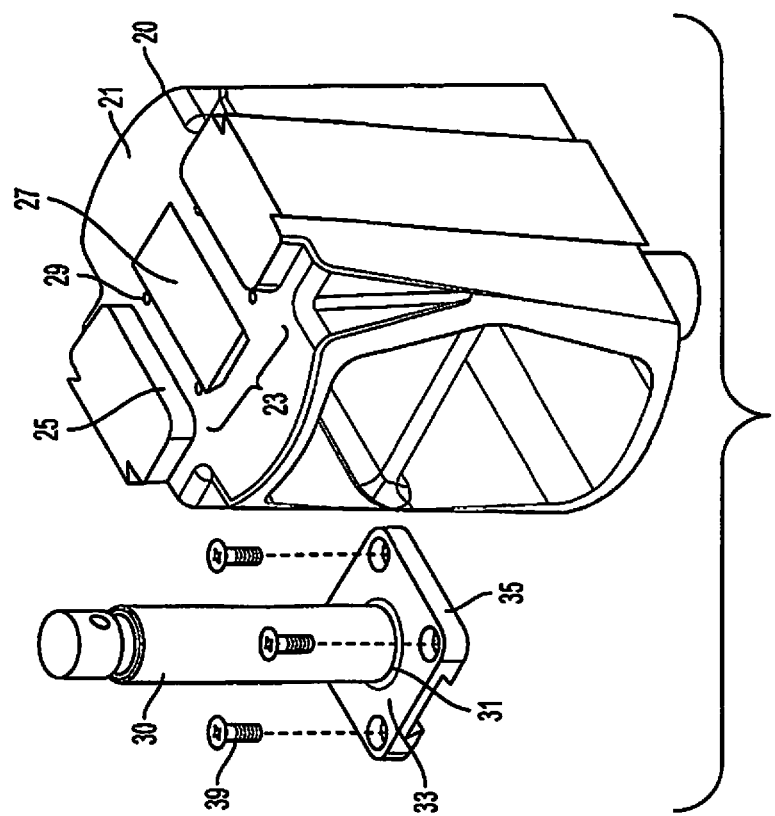
FIG. 3 is an exploded assembly view of a preferred embodiment of a plug with an attachable upper trunnion that is assembled to the main plug body using fasteners and a male-female dovetail fit. The plug valve in which the plug is used includes other components (see e.g. Cameron International Corporation GENERAL VALVE® TWIN SEAL™ valves) but those components are not the focus of this disclosure.
Figure 7:
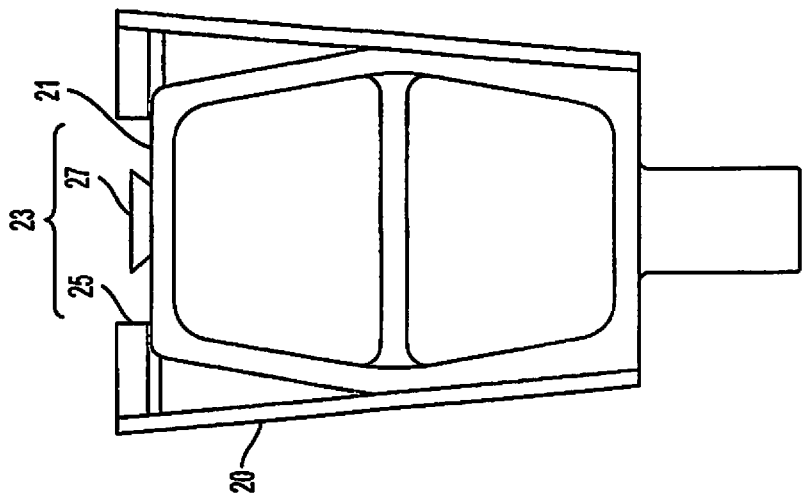
FIG. 7 is a front view of the main plug body of FIG. 3.
Figure 6:
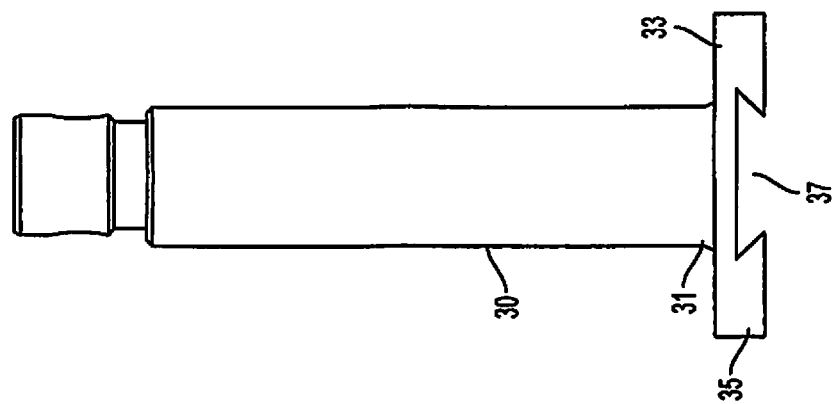
FIG. 6 is a front view of the upper trunnion of FIG. 3.
Figure 5:
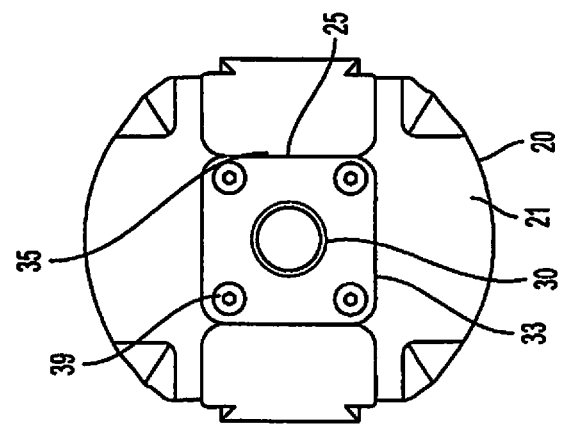
FIG. 5 is a top view of the assembled upper trunnion and main plug body of FIG. 4.

Referring to FIGS. 3-7, a preferred embodiment of a plug 10 includes a tapered (wedge-shaped) central or main plug body 20 and a stem or upper trunnion 30. The upper trunnion 30 is attachable to, and detachable from, the main plug body 20. Because the upper trunnion 30 is attachable to the main plug body 20, each component 20, 30 can be made separately from the other and then assembled together.

The main plug body 20 features a male dovetail 27 located in a channel 23 defined by two opposing sidewalls 25 at the upper end 21 of the plug 20. The upper trunnion 30 features a flange 33 having a female dovetail 37 at the lower end 31 of the trunnion 30. The flange 33 and its dovetail 37 are received by the channel 23 and its dovetail 27.

Fasteners 39 then secure the flange 33 in the channel 23 (which provides fastening holes 29 for the fasteners 39). In this assembled state, the tensile and compressive loading experienced by the main plug body 20 during its linear motion, and the torsional loading experienced during its 90° rotation, is supported by the fasteners 39 and the dovetail fit 27, 37.

The main plug body 20 and upper trunnion 30 can be made from the same material or, more preferably, from different materials. For example, the main plug body 20 is a first material and the upper trunnion 30 is a second different material that has higher strength, higher corrosion resistance, or both high strength and corrosion resistance than the first material.

The preferred embodiments described above and illustrated in the drawing figures provide examples of the system and method. The following claims define the inventive system and method and cover the full range of equivalents to which the recited elements of the claims are entitled.

What is claimed:

1. A plug adapted for use in a plug valve body and comprising a main plug body and an upper trunnion, the main plug body defining a passageway therethrough, said main plug body including at its upper end a first dovetail, said main plug body including at its upper end two opposing sidewalls that form a channel and the upper trunnion including at its lower end a flange, said flange defining a perimeter and a bottom surface, said perimeter of said flange defining a first sidewall and a second sidewall;

wherein when the plug is in an assembled state, one of said first sidewall and said second sidewall of the flange faces an opposing sidewall of the channel; and the upper trunnion including at its lower end a second dovetail complementary in shape to the first dovetail;

said flange defining a plate oriented normal to a longitudinal axis of said upper trunnion and extending outwardly from said lower end of said upper trunnion, said flange received in said channel wherein said first flange sidewall is adjacent a first sidewall of said channel and said second flange sidewall is adjacent a second sidewall of said channel;

wherein when the plug is in an assembled state the first and second dovetails overlap and contact one another.

2. The plug according to claim 1 wherein at least one of said flange sidewalls of the flange contacts an adjacent sidewall of the channel.

3. The plug according to claim 1 further comprising fasteners that pass through said flange and engage said upper end of said main plug body for securing the flange in the channel.

4. A plug according to claim 1 wherein the first dovetail is a male dovetail shape and the second dovetail is a female dovetail shape.

5. The plug according to claim 1 wherein the second dovetail being located in the flange.

6. The plug according to claim 5 further comprising fasteners that pass through said flange and engage said upper end of said main plug body for securing the flange to the upper end of the main plug body.

7. A plug according to claim 1 further comprising the main plug body being made of a first material and the upper trunnion being made of a second different material.

8. A plug according to claim 7 wherein the first and second different materials differ in strength of material.

9. A plug according to claim 7 wherein the first and second different materials differ in corrosion resistance.

10. A plug valve comprising:

a main plug body defining an upper end and a passageway therethrough, said upper end including a first area defining a first sidewall;

an upper trunnion extending away from said main plug body, said upper trunnion having a lower end;

a flange affixed to said upper trunnion adjacent said lower end of said upper trunnion, said flange defining a plate oriented normal to a longitudinal axis of said upper trunnion, said flange defining a perimeter that defines a flange sidewall;

a first dovetail located adjacent said first sidewall;

a second dovetail proximate said lower end of said upper trunnion, said second dovetail complementary in shape to said first dovetail;

wherein when the plug valve is in an assembled state the first and second dovetails overlap and contact one another and said flange sidewall of the flange is adjacent to said first sidewall of said first area of the upper end of the main plug body.

11. The plug valve according to claim 10 further comprising fasteners that pass through said flange and engage said upper end of said main plug body for securing the flange to said upper end of the main plug body.

12. The plug valve according to claim 10 wherein the flange sidewall of the flange contacts said first sidewall.

13. The plug valve according to claim 10 further comprising the main plug body being made of a first material and the upper trunnion being made of a second different material.

14. The plug valve according to claim 13 wherein the first and second different materials differ in strength of material, corrosion resistance, or strength of material and corrosion resistance.

15. The plug valve according to claim 10 further comprising:

a second area defining a second sidewall on said upper end of said main plug body;

wherein said first sidewall and said second sidewall defining a channel therebetween;

wherein said first dovetail is located between said first sidewall and said second sidewall in said channel.

16. The plug valve according to claim 15 wherein when the plug valve is in an assembled state, said first dovetail and said second dovetail overlay and contact one another and said sidewall of said flange is adjacent to said first sidewall and said second sidewall of said channel.

17. The plug valve according to claim 15 wherein:

wherein said flange defines a second flange sidewall that contacts said second sidewall of said channel.

\* \* \* \* \*